United States Patent
Jenkins et al.

(10) Patent No.: US 7,098,845 B2
(45) Date of Patent: Aug. 29, 2006

(54) APPARATUS FOR GENERATING AN INTEGRATOR TIMING REFERENCE FROM A LOCAL OSCILLATOR SIGNAL

(75) Inventors: Alan Peter Jenkins, Groton, MA (US); Robert Ian Gresham, Somerville, MA (US)

(73) Assignee: M/A-COM, Inc., Lowell, MA (US)

( * ) Notice: Subject to any disclaimer, the term of this patent is extended or adjusted under 35 U.S.C. 154(b) by 113 days.

(21) Appl. No.: 10/848,288

(22) Filed: May 18, 2004

(65) Prior Publication Data

US 2005/0258999 A1    Nov. 24, 2005

(51) Int. Cl.
*G01S 7/28* (2006.01)
(52) U.S. Cl. .................... 342/194; 342/175
(58) Field of Classification Search ............... 342/194
See application file for complete search history.

(56) References Cited

U.S. PATENT DOCUMENTS

| | | | | |
|---|---|---|---|---|
| 3,936,753 A | * | 2/1976 | Clark | 455/164.1 |
| 4,008,470 A | * | 2/1977 | Lanning et al. | 342/444 |
| 4,214,205 A | * | 7/1980 | Guest | 455/20 |
| 4,215,239 A | * | 7/1980 | Gordy et al. | 375/365 |
| 4,382,297 A | * | 5/1983 | Farrow | 370/544 |
| 4,398,286 A | * | 8/1983 | Geesen et al. | 370/492 |
| 4,509,372 A | * | 4/1985 | Mount | 73/861.28 |
| 5,253,239 A | * | 10/1993 | Edahiro et al. | 369/44.28 |
| 5,317,593 A | * | 5/1994 | Fulghum et al. | 370/342 |
| 5,774,450 A | * | 6/1998 | Harada et al. | 370/206 |
| 5,805,990 A | * | 9/1998 | Ohki | 455/343.5 |
| 6,587,072 B1 | * | 7/2003 | Gresham et al. | 342/70 |

* cited by examiner

*Primary Examiner*—Thomas H. Tarcza
*Assistant Examiner*—Matthew Barker

(57) ABSTRACT

A receiver circuit including an oscillator, a mixer coupled to the oscillator, a switch coupled to an output of the mixer, and an envelope detector coupled to the oscillator, such that the envelope detector generates a timing signal for actuating the switch based on the envelope of a signal produced by the oscillator. In one exemplary embodiment, the receiver circuit may be used as part of a radar based sensor system.

12 Claims, 2 Drawing Sheets

APPARATUS FOR GENERATING AN INTEGRATOR TIMING REFERENCE FROM A LOCAL OSCILLATOR SIGNAL

FIELD OF THE INVENTION

This present invention relates to receivers, and in particular, to a receiver including an 'integrate and dump' function.

BACKGROUND OF THE INVENTION

Radio frequency (RF) receivers often utilize an 'integrate and dump' function to demodulate a received RF signal. The 'integrate and dump' function essentially involves utilizing an integrator to generate an information (data) signal from a modulated RF signal using a local oscillator (LO). Once the information signal is demodulated, it is typically 'dumped' to a sample and hold circuit for further processing.

U.S. Pat. No. 6,587,072 (the "'072 Patent") describes a radar based sensor system which includes two separate 'integrate and dump' portions, one for in-phase (I) signals, and one for quadrature (Q) phase signals. FIG. 1 of the '072 patent shows a first 'integrate and dump' portion (I Channel) formed by mixer 44, integrator 48, sampler 51, and switch 52, and another 'integrate and dump' portion (Q Channel) formed by mixer 45, integrator 47, sampler 51, and switch 54. Particularly, the 'integrate' is performed by the mixers 44, 45 and the integrators 47, 48, and the 'dump' is performed by the sampler 51 and the switches 52, 54. The sampler 51 provides a timing signal for actuating the switches 52, 54 at a rate commensurate with the frequency of the pulses received at the receiving antenna 31, so that all incoming pulses are detected. If this timing signal is somehow delayed, or offset, accurate detection of the pulses will not be accomplished.

Implementations of 'integrate and dump' type receivers often require very stringent timing signals. Such receivers often experience differential delay offsets due to, for example, layout differences between the circuit board including the source of the timing signal and the circuit board including the integrator. At lower frequencies and slower clock rates, differential delay offsets are less problematic. However, at higher frequencies and clock speeds, accurate timing signals are required for proper operation. High Resolution Radar (HRR) is an example of a high frequency application which utilizes an 'integrate and dump' function in the receiver circuitry. For example, the above-referenced '072 Patent details an exemplary HRR system.

FIG. 1 shows a conventional receiver circuit 100 which includes an 'integrate and dump' function (i.e., similar to either of the I or Q Channels described above with reference to the '072 Patent). The 'integrate and dump' function is provided by amplifier 120, resistor 130, capacitor 140, and switch 150. The mixer 110 correlates an input RF signal with a local oscillator (LO) signal to produce an analog information (data) signal at the input of the amplifier 120. This information signal is then amplified by the amplifier 120, and applied through the resistor 130 to charge the capacitor 140 while the switch 150 is open. The amplifier 120, resistor 130, and capacitor 140 thus form the 'integrate' portion of the 'integrate and dump' circuit. The opening and closing of the switch 150 is controlled by a timing pulse provided by a separate timing circuit (not shown). The 'dump' takes place when the switch 150 is closed and the capacitor 140 discharges into the sample and hold circuit 160. As will be noted by those of ordinary skill in the art, the proper alignment of the LO signal and the timing pulse is essential to maintaining maximum efficiency of the correlation process, and thus maximizing the signal to noise ratio (SNR). If the timing signal experiences differential delays, it will become out of phase alignment with the LO signal, and thus degrade the efficiency of the receiver.

Thus, there is presently a need for a receiver including an 'integrate and dump' function which does not experience differential delay offsets at high frequencies.

SUMMARY OF THE INVENTION

An exemplary embodiment of the present invention comprises a circuit including an oscillator, a mixer coupled to the oscillator, a switch coupled to an output of the mixer, and an envelope detector coupled to the oscillator, wherein the envelope detector generates a timing signal for actuating the switch based on the envelope of a signal produced by the oscillator.

An exemplary embodiment of the present invention also comprises a receiver including an antenna capable of receiving at least one reflected signal from an object, an oscillator, a mixer coupled to the oscillator, the mixer operating on the at least one reflected signal and a signal produced by the oscillator, a switch coupled to an output of the mixer, and an envelope detector coupled to the oscillator, wherein the envelope detector generates a timing signal for actuating the switch based on the envelope of a signal produced by the oscillator.

An exemplary embodiment of the present invention also comprises a sensor system including a transmitter for transmitting at least one pulse towards an object and a receiver for receiving at least one pulse reflected off of the object, said receiver including an oscillator, a mixer coupled to the oscillator, a first switch coupled to an output of the mixer, and an envelope detector coupled to the oscillator, wherein the envelope detector generates a timing signal for actuating the switch based on the envelope of a signal produced by the oscillator.

DETAILED DESCRIPTION

Figure 1:
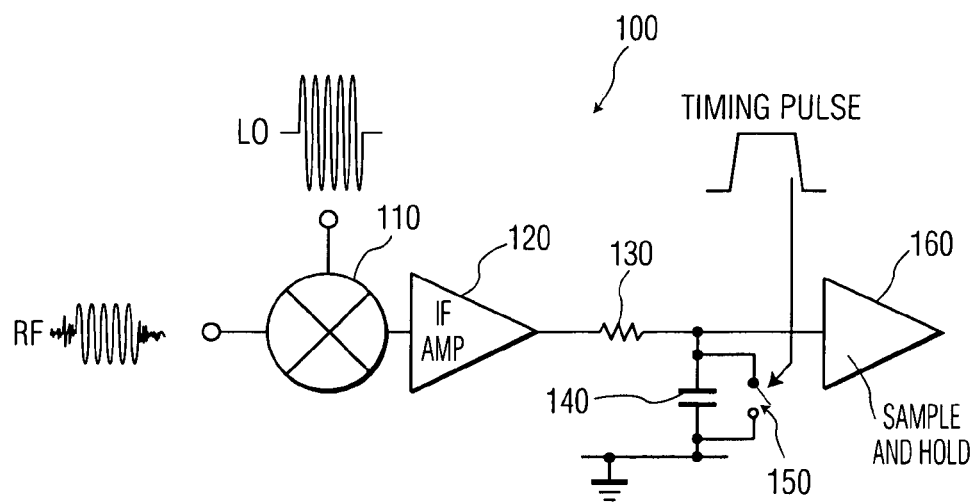
FIG. 1 shows a schematic diagram of a conventional receiver circuit including an 'integrate and dump' portion.
Figure 2:
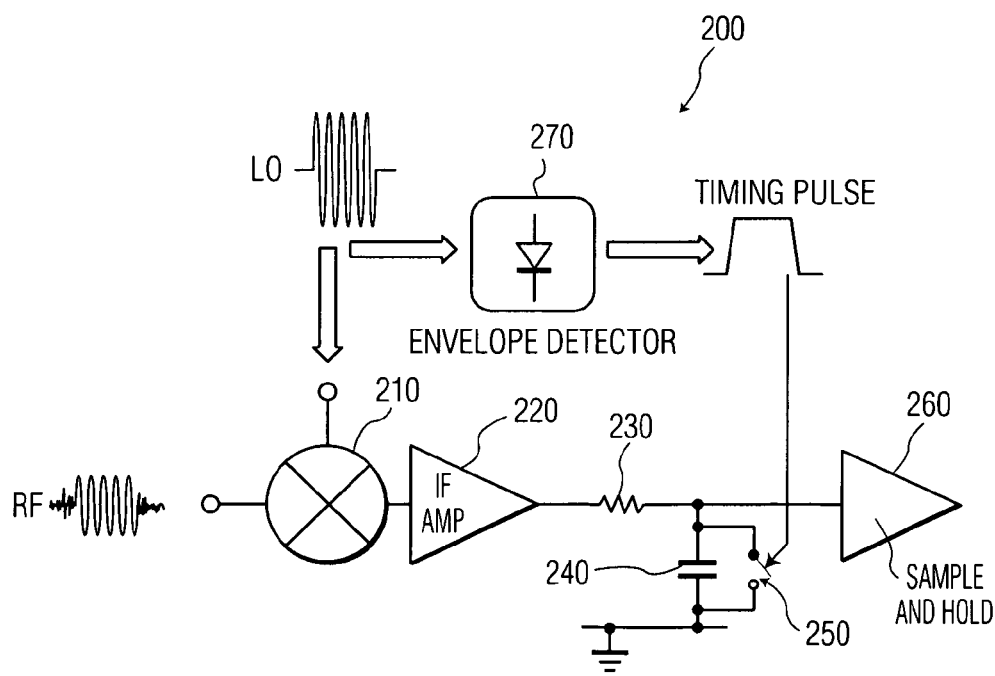
FIG. 2 shows a schematic diagram of a receiver circuit including an 'integrate and dump' portion according to an exemplary embodiment of the present invention.

FIG. 2 shows a receiver circuit 200 according to an exemplary embodiment of the present invention. The receiver circuit 200 is similar to the receiver circuit 100 shown in FIG. 1, and like reference numerals are used to refer to like elements. Alternatively from the receiver circuit 100 shown in FIG. 1, the receiver circuit 200 includes an envelope detector 270 for producing a timing signal directly from the local oscillator (LO). Preferably, all the elements of receiver circuit 200 shown in FIG. 2 are disposed on a single integrated circuit (IC) chip (die).

An 'integrate and dump' function is provided by amplifier 220, resistor 230, capacitor 240, and switch 250. The mixer 210 correlates an input RF signal with a local oscillator (LO) signal to produce an analog information (data) signal at the input of the amplifier 220. This information signal is then amplified by the amplifier 220, and applied through the resistor 230 to charge the capacitor 240 while the switch 250 is open. The amplifier 220, resistor 230, and capacitor 240 thus form the 'integrate' portion of the 'integrate and dump' circuit. The 'dump' takes place when the switch 250 is closed and the capacitor 240 discharges into the sample and hold circuit 260.

A timing signal for opening and closing the switch 250 may be provided by an envelope detector 270 coupled to the LO signal source. Generating the timing signal in this manner permits all elements of the receiver circuit 200 to be co-located on a single IC chip (die), as discussed above, thus reducing the problem of layout differences between the IC generating the timing signal and the IC containing the controlled switch (e.g., switch 150 in the conventional receiver circuit 100 shown in FIG. 1). Accordingly, the only source of timing offsets (i.e., delays) between the LO signal and the 'integrate and dump' switch 250 will be on the IC chip (die), and thus controllable.

Particularly, by selecting specific devices and trace lengths for the elements of the receiver circuit 200 on the IC chip (die), the overall delay of the receiver circuit 200 may be controlled. For example, there are two (2) possible paths in which delays may be generated. A first path (Path 1) comprises the electrical path from the LO signal source, to the mixer 210, to the amplifier 220, to the resistor 230, to the capacitor 240 and to ground. A second path (Path 2) comprises the electrical path from the LO signal source, through the envelope detector 270, and to the switch 250. Presumably, all the elements in Paths 1 and 2 are formed on a single IC chip (die) and are coupled to each other by electrical traces also formed on the IC chip (die). The electrical elements in Paths 1 and 2 (e.g., mixer 210, amplifier 220, resistor 230, capacitor 240, switch 250, and envelope detector 270) all have a specific associated delay which is known. Similarly, the electrical traces coupling these electrical elements to one another also have a specific associated delay which is known. These associated delays may be managed during the fabrication of the IC chip (die) so that they have substantially no effect on the actuation of the switch 250. For example, the delay in Path 1 may be made substantially equivalent to the delay in Path 2, so that the actual delay realized at the switch 250 is substantially zero (0).

The envelope detector 270 operates to generate an alternating timing signal as follows. As is well known in the art, every signal has a boundary within which it is contained; this boundary is an imaginary line, and is often referred to as the signal's 'envelope.' The envelope preferably has an upper limit and a lower limit when viewed in the time domain. For example, the upper limit may be a voltage value of +5 Volts (V) and the lower limit may be a value of −5V. The envelope detector 270 detects these upper and lower limits and generates a signal based thereon. Particularly, when the input signal to the envelope detector 270 varies between its upper and lower limits (e.g., between +5V and −5V), the output of the envelope detector is a first voltage value (e.g., +1V). Similarly, when the input signal to the envelope detector 270 is not varying between upper and lower limits, the output of the envelope detector is a second voltage value (e.g., 0 V).

In the exemplary embodiment shown in FIG. 2, the envelope detector 270 detects the upper and lower limits of the LO signal. The signal generated by the envelope detector 270 preferably comprises a square wave which oscillates between first and second voltage values (e.g., 0V and +1V) corresponding to two different states of the LO signal. Particularly, when the LO signal is substantially zero (0), the envelope detector 270 produces a voltage value of 0V, for example. Alternatively, when the LO signal oscillates between its upper and lower limits (e.g., +5V and −5V), the envelope detector 270 produces a voltage value of +1V, for example. The LO signal shown at the input of the envelope detector 270 in FIG. 2, and the timing pulse shown at the output, correspond directly in time. For example, at the beginning and end of both the LO signal and the timing signal they have the same voltage (e.g., 0 V). However, when the LO signal is oscillating between minima and maxima, the timing signal produces a continuous voltage (e.g., +1 V).

The generated 'envelope' (timing) signal may be used to control the ON/OFF timing of the switch 250 of the receiver circuit 200. In particular, as the envelope (timing) signal changes states (e.g., between 0 V and +1 V), so does the switch 250. For example, the switch 250 may be open while the LO signal is oscillating, corresponding to a first state (e.g.,+1 V) of the voltage signal produced by envelope detector 270, and may close when the LO signal ceases oscillating, corresponding to a second state (e.g., 0 V) of the voltage signal produced by the envelope detector 270.

Using the pre-existing LO signal as a basis for the timing signal for the switch 250 allows for the elimination of separate timing generation circuitry (which would often be disposed on a separate IC chip (die), and thus reduces the overall size and complexity of the receiver circuit 200.

By disposing all the elements of the receiver circuit 200 on a single IC chip (die), the number of interconnects required between transmit and receive dies (in a transceiver package) will be reduced, thus simplifying both the overall package design, and the circuit board layout. In addition, the amount of digital noise on the circuit board will be reduced through the reduction of chips (dies) and interconnects.

The receiver circuit 200 described above may form part of a radar based sensor system, such as described in U.S. Pat. No. 6,587,072 (the "'072 Patent"), which is incorporated herein by reference.

Figure 3:
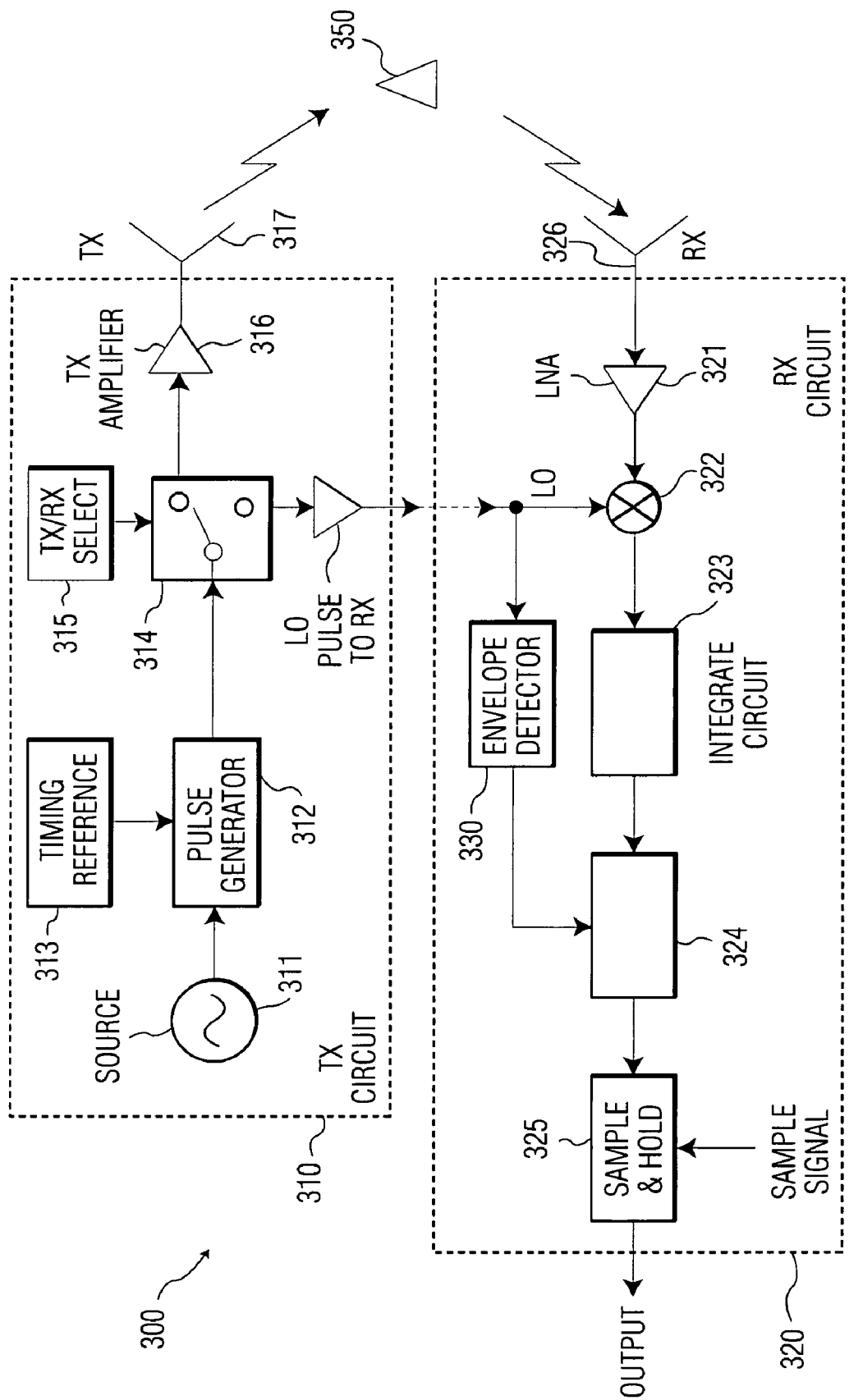
FIG. 3 shows a schematic diagram of radar based sensor system according to an exemplary embodiment of the present invention.

FIG. 3 shows a radar based sensor system 300 according to an exemplary embodiment of the present invention. The sensor system 300 includes a 'transmit' arm 310 including a signal source 311, a pulse generator 312, a pulse generator timing reference 313, a transmit/receive select switch 314, a switch driver 315, an output amplifier 316, and a transmit antenna 317. The signal source 311 provides an oscillating signal of a specific frequency to the pulse generator which generates a Local Oscillator (LO) signal therefrom. When the sensor system 300 is in a 'transmit' mode, this LO signal is amplified (by output amplifier 316), and transmitted by the transmit antenna 317 towards an object 350. The 'transmit' arm 310 also includes a switch 314 for providing the LO signal to a 'receive' arm 320, explained below.

A 'receive' arm 320 of the sensor system 300 includes at least one low noise amplifier (LNA) 321, a mixer 322, an integrator circuit 323, a switch 324, a sample and hold circuit 325, a receive antenna 326 and an envelope detector 330. When the sensor system 300 is in a 'receive' mode, the LO signal is applied to the mixer 322 and the envelope detector 330, while the receive antenna 326 receives signals reflected back off the above-referenced object 350. Although only one receive arm is shown in the exemplary sensor system 300, it will be understood by those of ordinary skill in the art that multiple 'receive' arms are within the scope of the present invention (e.g., a 'receive' arm for in-phase (I) signals, and a 'receive' arm for quadrature phase (Q) signals).

The transmit/receive select switch 314 of the sensor system 300 selects which arm (e.g., 'transmit' 310 or 'receive' 320) of the system is in operation at any particular time. The transmit/receive select switch 314 is controlled by a control signal issued by switch driver 315. When the 'transmit' arm 310 is in operation, transmit antenna 317 sends signals toward an object 350. When the 'receive' arm 320 is in operation, receive antenna 326 receives signals which are reflected back from the object 350.

The envelope detector 330 is coupled to the LO signal to provide timing signals to the switch 324 (as opposed to the independent timing signal(s) provided to the switches 52, 54 by sampler 51 in the '072 Patent). As described above with reference to the receiver circuit 200, the envelope detector 330 detects the 'envelope' of the LO signal and generates a timing signal therefrom. This timing signal is then used to control the actuation of the switch 324.

Preferably, delays in the electrical paths from the LO source through the mixer 322 and to the switch 324, and from the LO source through the envelope detector 330 and to the switch 324 have been equalized during fabrication (as discussed above) so that the switch 324 sees substantially no delay.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A circuit comprising:
an oscillator;
a mixer coupled to the oscillator;
a switch coupled to an output of the mixer; and,
an envelope detector coupled to the oscillator,
wherein an envelope detector generates a timing signal for actuating the switch based on the envelope of a signal produced by the oscillator.

2. The circuit of claim 1, further comprising:
an amplifier coupled between the mixer and the switch.

3. The circuit of claim 1, wherein the timing signal oscillates between a first state and a second state.

4. The circuit of claim 3, wherein the first state corresponds to an oscillating signal produced by the oscillator, and the second state corresponds to a non-oscillating signal produced by the oscillator.

5. The circuit of claim 3, wherein said first state corresponds to a first voltage value and said second state corresponds to a second voltage value.

6. A receiver comprising:
an antenna capable of receiving at least one reflected signal from an object;
an oscillator;
a mixer coupled to the oscillator, said mixer operating on said at least one reflected signal and a signal produced by said oscillator;
a switch coupled to an output of the mixer; and,
an envelope detector coupled to the oscillator,
wherein the envelope detector generates a timing signal for actuating the switch based on the envelope of a signal produced by the oscillator.

7. The receiver of claim 6, wherein the timing signal oscillates between a first state and a second state.

8. A sensor system comprising:
a transmitter for transmitting at least one pulse towards an object; and
a receiver for receiving at least one pulse reflected off of the object, said receiver comprising:
an oscillator;
a mixer coupled to the oscillator;
a first switch coupled to an output of the mixer; and,
an envelope detector coupled to the oscillator,
wherein the envelope detector generates a timing signal for actuating the switch based on the envelope of a signal produced by the oscillator.

9. The sensor system of claim 8, further comprising a second switch for selecting one of either the transmitter or receiver.

10. The sensor system of claim 8, further comprising a sample and hold circuit coupled to the output of the first switch.

11. The sensor system of claim 8, further comprising at least one antenna coupled to the transmitter for transmitting a signal towards an object.

12. The sensor system of claim 8, wherein the timing signal oscillates between a first state and a second state.

* * * * *